US012402230B1

(12) United States Patent
Law

(10) Patent No.: US 12,402,230 B1
(45) Date of Patent: Aug. 26, 2025

(54) APPARATUS AND METHOD OF VEHICLE HEADLAMP CONTROL DEVICE

(71) Applicant: Calvin Law, Chino, CA (US)

(72) Inventor: Calvin Law, Chino, CA (US)

( * ) Notice: Subject to any disclaimer, the term of this patent is extended or adjusted under 35 U.S.C. 154(b) by 0 days.

(21) Appl. No.: 18/518,504

(22) Filed: Nov. 23, 2023

(51) Int. Cl.
*H05B 47/19* (2020.01)

(52) U.S. Cl.
CPC .................................... *H05B 47/19* (2020.01)

(58) Field of Classification Search
CPC ...................................................... H05B 47/19
See application file for complete search history.

(56) References Cited

U.S. PATENT DOCUMENTS

| | | | | | |
|---|---|---|---|---|---|
| 9,374,874 | B1 * | 6/2016 | Ewing | G08C 17/02 |
| 10,605,427 | B1 * | 3/2020 | Chen | F21S 41/43 |
| 11,678,296 | B1 * | 6/2023 | Luterman | H04W 76/40<br>370/329 |
| 12,160,943 | B1 * | 12/2024 | Law | B60Q 1/04 |
| D1,065,628 | S * | 3/2025 | Sperling | D26/28 |
| 2019/0118699 | A1 * | 4/2019 | Wu | B60Q 1/076 |
| 2020/0331552 | A1 * | 10/2020 | Horn | B62J 6/024 |
| 2023/0272895 | A1 * | 8/2023 | Yonemaru | F21S 41/13<br>348/148 |

FOREIGN PATENT DOCUMENTS

| | | | | | |
|---|---|---|---|---|---|
| CA | 3043822 | A1 * | 11/2019 | H05B 47/105 |
| JP | 2024121133 | A * | 9/2024 | |
| JP | 2024130011 | A * | 9/2024 | |
| JP | 2025019877 | A * | 2/2025 | |
| WO | WO-2021042002 | A1 * | 3/2021 | B60H 1/00785 |

* cited by examiner

*Primary Examiner* — Adam D Houston
(74) *Attorney, Agent, or Firm* — Alexander Chen, Esq.

(57) ABSTRACT

A pattern-light lamp comprises a lamp unit, a control box connected to the lamp unit via a wired or wireless method, a mobile user interface connected wirelessly to the control box, and controlling the control box, which in turn controls the lamp unit. The lamp unit comprises a modifiable light rate component, a light pattern component, and a light color component. The control box comprises a modifiable light rate control unit, a light pattern control unit, and a light color control unit. The mobile user interface comprises a modifiable light rate module, a light pattern module, and a light color module.

20 Claims, 9 Drawing Sheets

APPARATUS AND METHOD OF VEHICLE HEADLAMP CONTROL DEVICE

FIELD OF INVENTION

The present invention is a smart headlamp lighting control system that allows the user to modify the color, flash rate, and lighting pattern of the various lights within aftermarket headlamps. The headlamp uses a control box (or circuit board) and includes a unique user interface. The user interface comes in the form of a mobile application that allows the user to choose the color as well as the light-up or flashing pattern (e.g., sequential light up), a user-devised schedule for color, rate, and pattern for each of the various lights within the headlamp, which can be based upon music. It is the first of its kind to provide a solution both for the control box and user interface.

BACKGROUND

Aftermarket equipment, or the secondary market of the automotive industry, is concerned with the manufacturing, remanufacturing, distribution, retailing, and installation of all vehicle parts, chemicals, equipment, and accessories, after the sale of the automobile by the original equipment manufacturer (OEM) to the consumer. The purchase of such aftermarket parts is a popular way for automobile enthusiasts to personalize their vehicles.

One such popular piece of equipment is the headlamp, which is a lamp attached to the front of a vehicle to illuminate the road ahead. While the color of the lights within the lamp, from the running and primary lights (white or selective yellow) and blinkers (amber), are subject to regulation, there is still room for some adaption in order to permit vehicle personalization. However, it has heretofore been a complicated process for the user to modify and manage such personalization.

Thus, it is desirable for a solution both for the control box appended to the headlamp and a mobile user interface to customize the headlamp.

OBJECTIVE OF THE INVENTION

It is an object of this invention to create a solution for the control box appended to the headlamp in order to regulate color, rate, and pattern of each light therein.

It is an additional object of this invention to provide a user-friendly mobile interface for the user to easily modify and manage the color, rate, and pattern of each light.

It is a further object of this invention to prevent the user from violating any vehicle lighting laws while in motion.

It is a further object of this invention to provide music data, which commands the color, rate, and pattern of the headlamp according to a pre-determined algorithm.

SUMMARY OF THE INVENTION

Brief Description

The present invention will be understood and appreciated more fully from the following detailed description taken in conjunction with the drawings in which.

DETAILED DESCRIPTION

The invention will be described in the context of a preferred embodiment.

Figure 1:
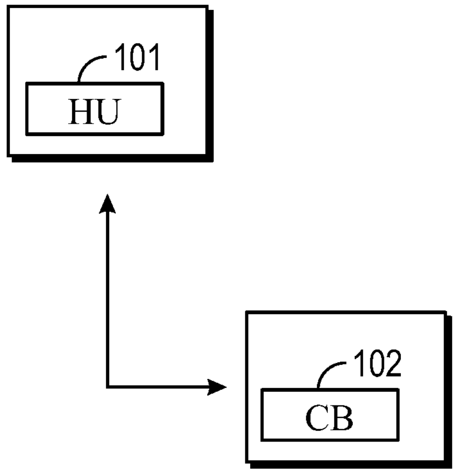
FIG. 1 illustrates a block diagram of the three components of the invention: headlamp, control box, and mobile user interface.

FIG. 1 illustrates a block diagram showing how the three components of the invention connect and interact. The headlamp unit 101 connects to the control box 102, which connection can be wired or wireless (in this embodiment it is wired). The control box 102 then connects wirelessly through Bluetooth or Wi-Fi technology to the mobile user interface 103, which in the preferred embodiment exists in the form of an application downloaded onto the user's mobile phone 104. The control box 102 gives instruction from the mobile 104 user interface 103 to the headlamp 101.

Figure 2:
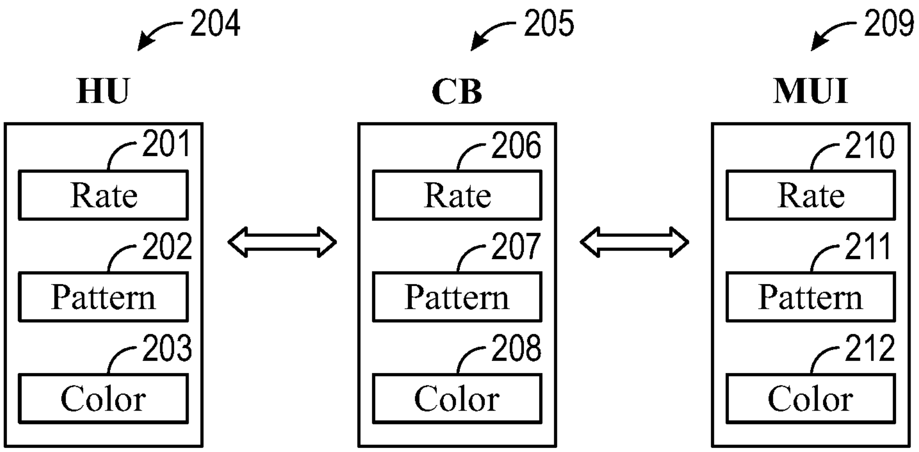
FIG. 2 illustrates a block diagram of the modifiable portions of each of the three components of the invention.

FIG. 2 illustrates a block diagram showing the modifiable portions of each of the three components of the invention. The headlamp 204 contains modifiable light rate 201 (how it flashes, e.g. 1× per second, 10× per second), light pattern 202 (e.g., flash or sequential light-up), and light color 203, the instructions for which come from the control box 205. The control box 205 contains modifiable light rate 206, light pattern 207, and light color 208, the instructions for which come from the mobile user interface 209. The mobile user interface 209 contains modifiable light rate 210, light pattern 211, and light color 212.

Figure 3:
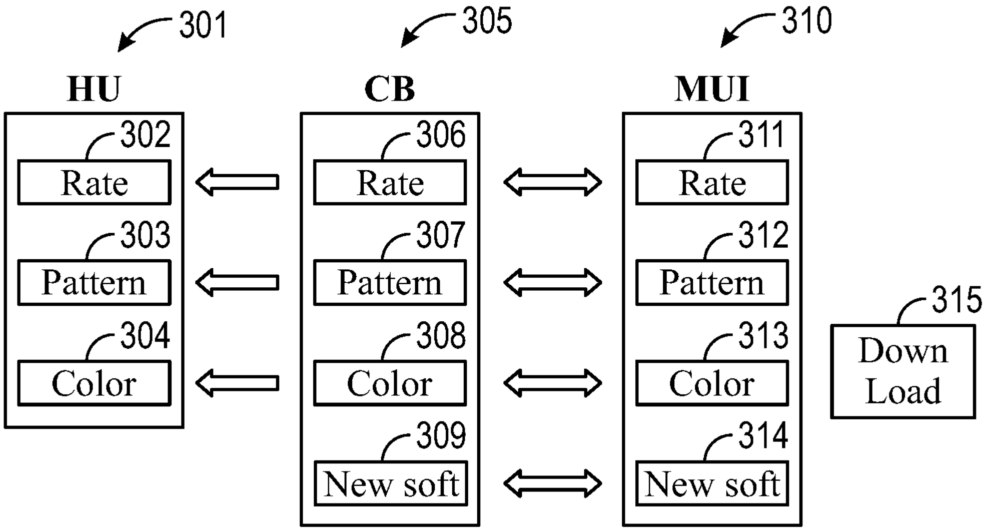
FIG. 3 illustrates a block diagram of the mobile user interface coupled with the software download module.

FIG. 3 illustrates a block diagram showing the mobile user interface 310 coupled with a software 314 download module 315, which permits the user to acquire new colors 313, light rates 311, and light patterns 312. The control box 305 also contains a new software module 309 for additional rate 306, pattern 307, and color 308 options as they come available. The headlamp unit 301 is again shown with modifiable light rate 302, light pattern 303, and light color 304.

Figure 4:
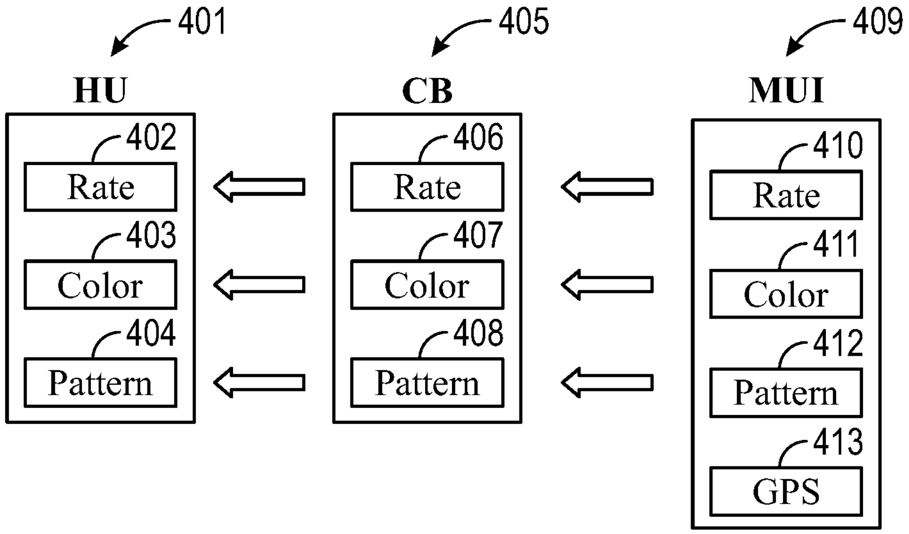
FIG. 4 illustrates a block diagram showing the GPS module introduced to the mobile user interface.

FIG. 4 illustrates a block diagram which introduces a global positioning software (GPS) module 413 into the mobile user interface 409. The GPS 413 prevents the user from violating any vehicle lighting laws by prohibiting any potentially illegal combinations of light rate 410, color 411, and pattern 412 while the vehicle is moving. The mobile user interface is shown connecting to the control box 405, which itself contains light rate 406, color 407, and pattern 408. The headlamp unit 301 is again shown with modifiable light rate 402, light color 403, and light pattern 404.

Figure 5:
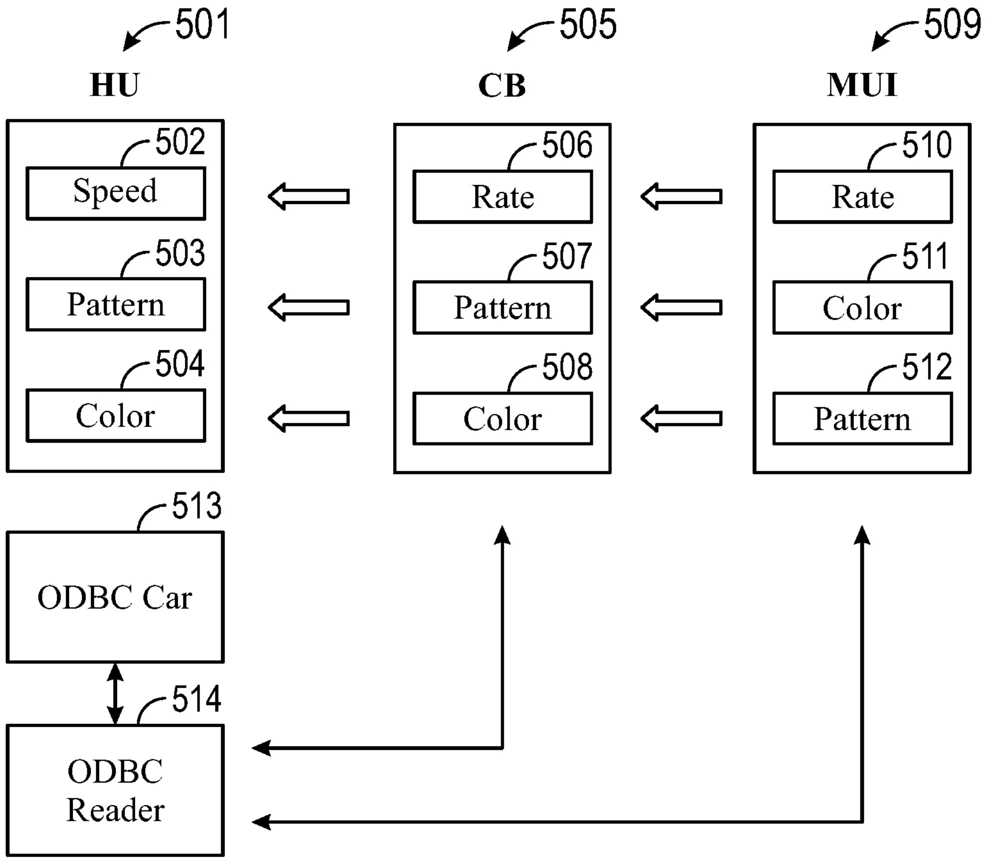
FIG. 5 illustrates a block diagram showing an embodiment of the invention using an on-board diagnostics connector.

FIG. 5 illustrates a block diagram of a second embodiment of the invention, for use when a user does not wish to use their mobile phone, hence an alternate to the GPS on the mobile unit is needed. The headlamp 501 is shown with its components of modifiable light rate 502, pattern 503, and color 504. The control box 505 is shown connecting to the headlamp 501, again with its components of modifiable light rate 506, pattern 507, and color 508. An on-board diagnostics module (OBD) 513, which plugs into the vehicle under the dashboard, with an OBD reader 514 that connects to the control box 505, again shown with light rate 506, pattern 507, and color 508. The control box 505 can have a wired connection to the OBD 513, which is an alternative way to prevent the user from violating any vehicle lighting laws by prohibiting any potentially illegal combinations of light rate 506, color 508, and pattern 507 while the vehicle is moving, turning, inter alia. In yet another embodiment, the mobile user interface 509 is shown connected to the OBD reader 514 as well as the control box 505, again containing modifiable light rate 510, color 511, and pattern 512. In one embodiment, the apparatus can have the GPS included within the control box 505.

Figure 6:
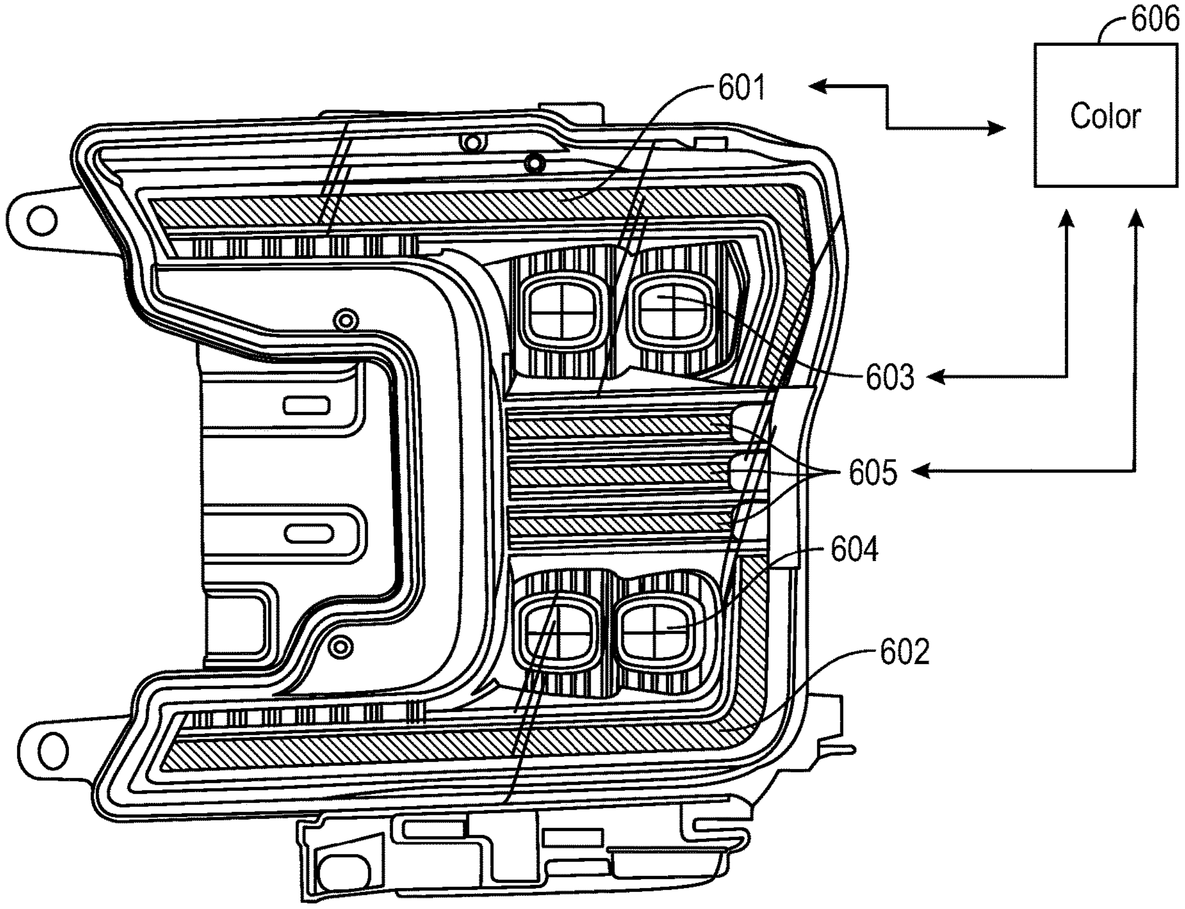
FIG. 6 illustrates the headlamp component of the invention and the various types of lights therein for which the color may be modified separately.

FIG. 6 illustrates the headlamp component 607 comprising an upper daylight running light 601, lower daylight running light 602, upper primary lights 603, lower primary lights 604, and turn signal lights 605. The color 606 of each of these lights may be modified by the user.

Figure 7:
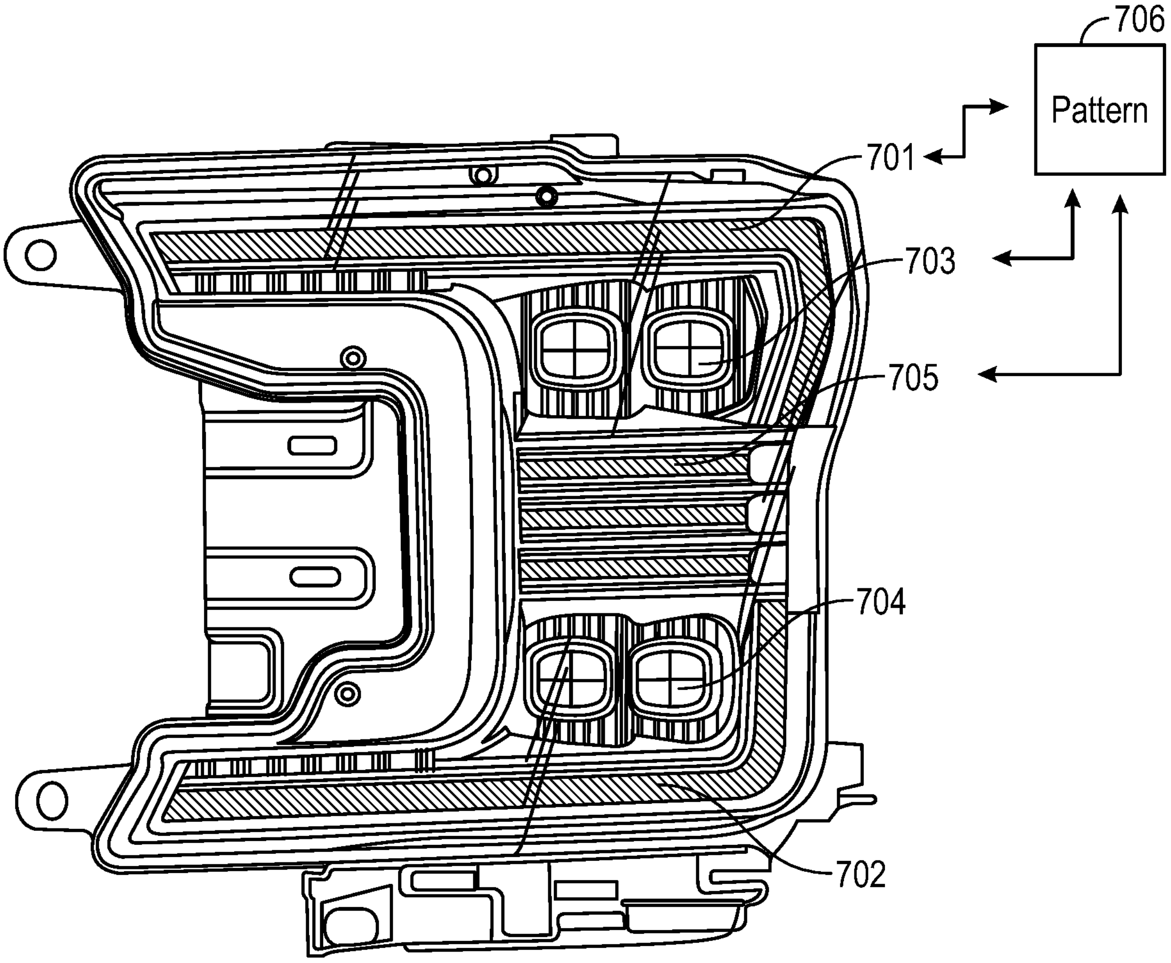
FIG. 7 illustrates the headlamp component of the invention and the various types of lights therein for which the light up pattern may be modified separately.

FIG. 7 illustrates the headlamp component ( ) comprising an upper daylight running light 701, lower daylight running light 702, upper primary lights 703, lower primary lights 704, and turn signal lights 705. The light up pattern 706 of each of these lights may be modified by the user.

Figure 8:
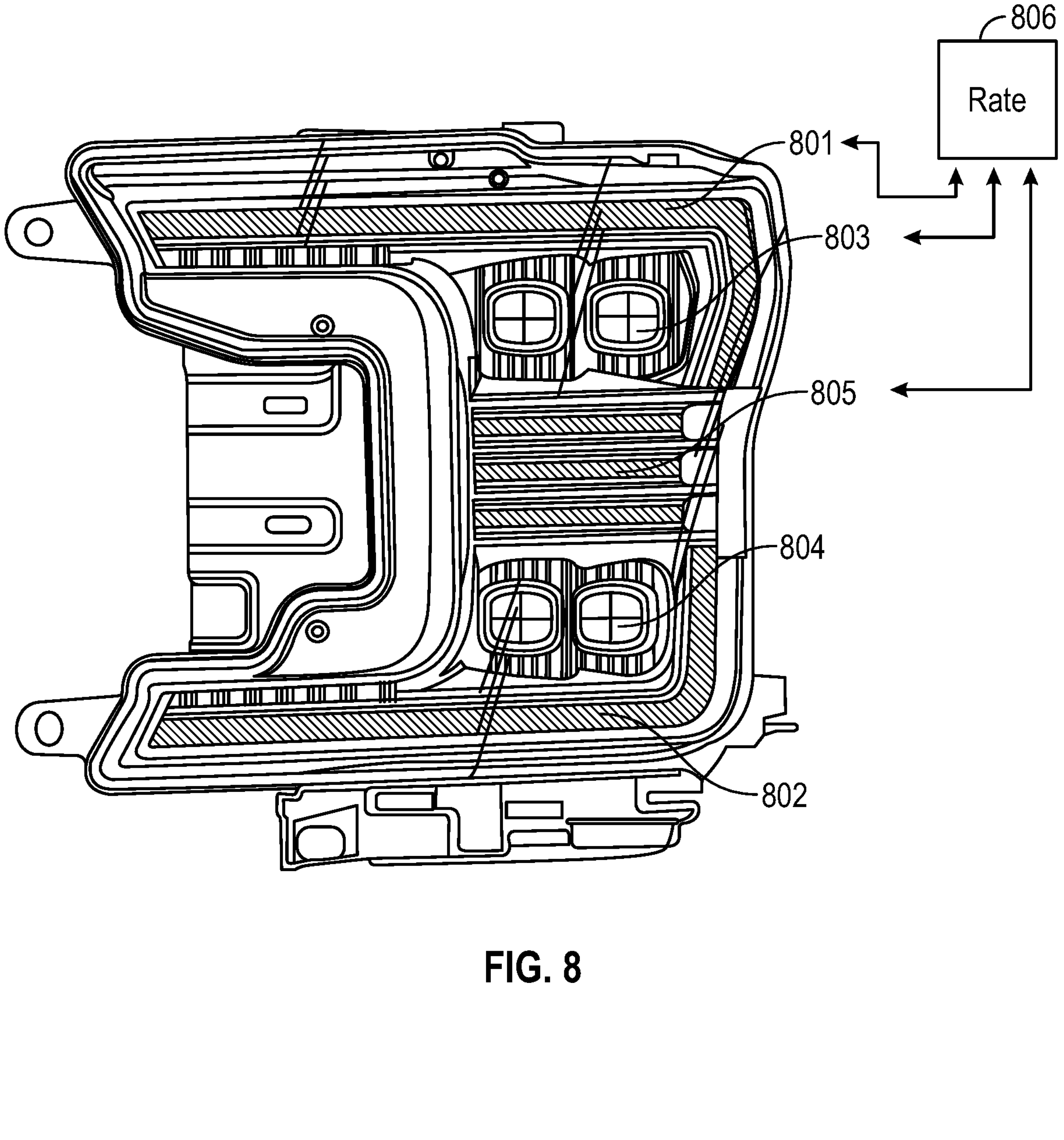
FIG. 8 illustrates the headlamp component of the invention and the various types of lights therein for which the light rate may be modified separately.

FIG. 8 illustrates the headlamp component 707 comprising an upper daylight running light 801, lower daylight running light 802, upper primary lights 803, lower primary lights 804, and turn signal lights 805. The light rate 806 of each of these lights may be modified by the user.

Figure 9:
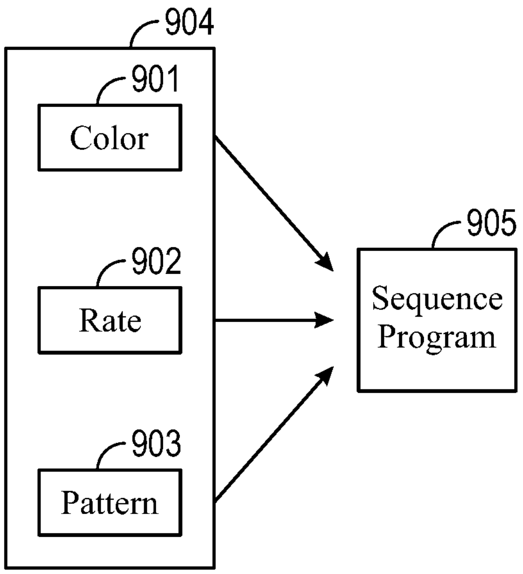
FIG. 9 illustrates a sequence program module in the mobile user interface.

FIG. 9 illustrates a sequence program module 905 permitting the user to design a sequence of all three modifiers, color 901, rate 902, and pattern 903, instead of changing each one at a time. The sequence program module 905 connect to the mobile user interface 904.

Figure 10:
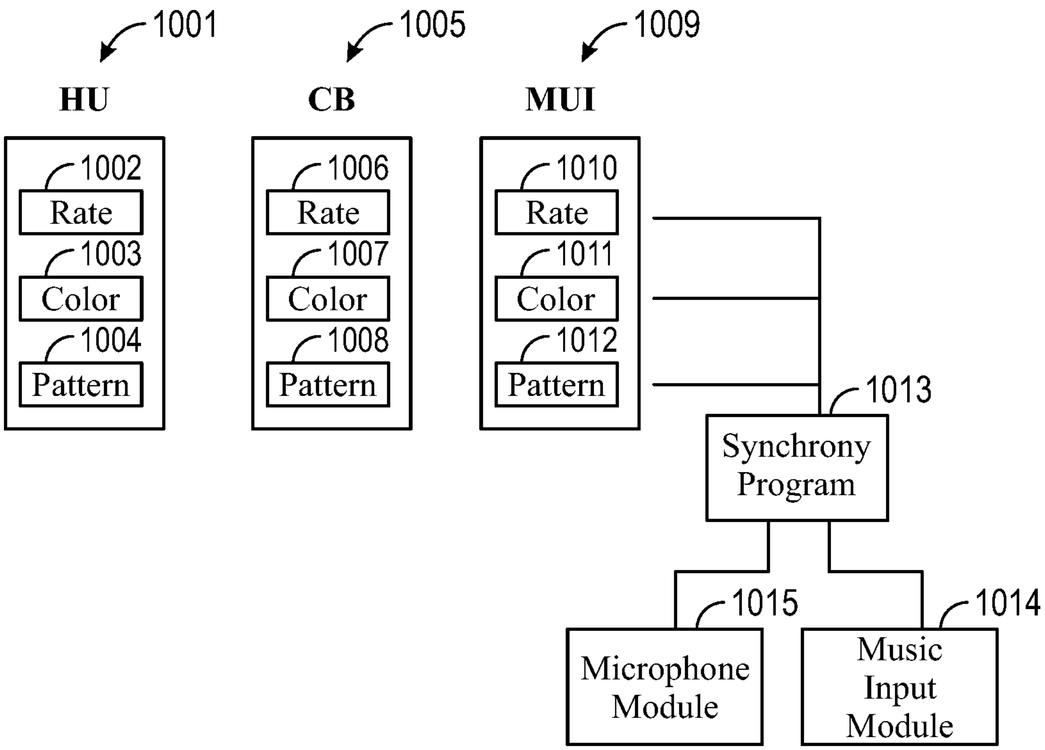
FIG. 10 illustrates a music synchronizing program connected to the mobile user interface.

FIG. 10 illustrates a music synchronizing program 1013 downloaded to the mobile user interface 1009, which itself has a microphone module 1015 and a music input module 1014, which will use artificial intelligence to synchronize the light rate 1010, color 1011, and pattern with the beats of music coming through the music input module 1014. The music input module 1014 is the form of data from the cloud or a memory card, etc. The microphone module 1015 records the analog music played in the environment, which it then converts to data. The mobile user interface then connects to the control box 1005, which contains the rate 1006, color 1007, and pattern 1008 modules. The control box 1005 then controls the headlamp unit with rate 1002, color 1003, pattern 1004 modules.

The invention claimed is:

1. A pattern-light lamp comprising:

a lamp unit;

a control box, wherein said lamp unit connects to said control box with at least one of wired or wireless method;

a mobile user interface, wherein said mobile user interface connects wirelessly to said control box with at least one of Bluetooth or Wi-Fi technology; wherein said mobile user interface gives instructions to said control box, which in turn gives commands to said lamp unit;

wherein said lamp unit comprises a modifiable light rate component that controls how lights flash and flashing speed;

wherein said lamp unit further comprises a light pattern component that controls light patterns;

wherein said lamp unit further comprises a light color component that controls light colors;

wherein said control box further comprises a modifiable light rate control unit that commands said light rate component;

wherein said control box further comprises a light pattern control unit that commands said light pattern component;

wherein said control box further comprises a light color control unit that commands said light color component;

wherein said mobile user interface further comprises a modifiable light rate module that commands said modifiable light rate control unit;

wherein said mobile user interface further comprises a light pattern module that commands said light pattern control unit;

wherein said mobile user interface further comprises a light color module that commands said light color control unit.

2. The lamp of claim 1, wherein said mobile user interface further comprises a software download module that permits a user to acquire new light colors, new light color control unit, new light color module; new light rates, new light rate unit, new light rate module; and new light patterns, new light pattern unit, new light pattern module.

3. The lamp of claim 1, wherein said mobile user interface further comprises a global positioning software (GPS) module that gathers local traffic laws and builds dynamic filters that filter out illegal light patterns.

4. The lamp of claim 1, wherein said control box comprises a GPS component.

5. The lamp of claim 1 further comprises an on-board diagnostics module (OBD) that connects to a vehicle's internal system under a dashboard; wherein said OBD connects to said control box;

wherein said OBD further comprises a reader module that provides data to said control box.

6. The lamp of claim 5, wherein said OBD connects to said mobile user interface.

7. The lamp of claim 1 further comprises upper and lower daylight running lights, upper and lower primary lights, and turn signal lights.

8. The lamp of claim 1, wherein said control box further comprises a sequence control unit that permits a user to design a sequence of all three control units: said light color control unit, light pattern control unit, and light rate control unit; wherein said sequence control unit connects to said mobile user interface.

9. The lamp of claim 1, wherein said mobile user interface further comprises a music synchronizing module that interfaces with said sequence control unit; wherein said music synchronizing module is downloadable; wherein said music synchronizing module in turn comprises a microphone module and a music input module that use artificial intelligence to synchronize a sequence of musical beats with a sequence of light rates, colors, and patterns.

10. The lamp of claim 9, wherein said music input module is a data stream from a digital storage, comprising at least one of a digital cloud, a memory card, or other digital storage device.

11. A method for a pattern-light lamp comprising:

providing a lamp unit;

providing a control box;

connecting said lamp unit to said control box with at least one of wired or wireless method;

providing a mobile user interface;

connecting said mobile user interface wirelessly to said control box with at least one of Bluetooth or Wi-Fi technology; wherein said mobile user interface gives instructions to said control box, which in turn gives commands to said lamp unit;

wherein said lamp unit comprises a modifiable light rate component that controls how lights flash and flashing speed;

wherein said lamp unit further comprises a light pattern component that controls light patterns;

wherein said lamp unit further comprises a light color component that controls light colors;

wherein said control box further comprises a modifiable light rate control unit that commands said light rate component;

wherein said control box further comprises a light pattern control unit that commands said light pattern component;

wherein said control box further comprises a light color control unit that commands said light color component;

wherein said mobile user interface further comprises a modifiable light rate module that commands said modifiable light rate control unit;

wherein said mobile user interface further comprises a light pattern module that commands said light pattern control unit;

wherein said mobile user interface further comprises a light color module that commands said light color control unit.

12. The method of claim 11, wherein providing a software download module that permits a user to acquire new light colors, new light color control unit, new light color module; new light rates, new light rate unit, new light rate module; and new light patterns, new light pattern unit, new light pattern module.

13. The method of claim 11, wherein providing a global positioning software (GPS) module that gathers local traffic laws and builds dynamic filters that filter out illegal light patterns.

14. The method of claim 11, wherein said control box comprises a GPS component.

15. The method of claim 11, wherein providing an on-board diagnostics module (OBD) that connects to a vehicle's internal system under a dashboard; wherein said OBD connects to said control box; wherein said OBD further comprises a reader module that provides data to said control box.

16. The method of claim 11, wherein said OBD connects to said mobile user interface.

17. The method of claim 11, wherein said lamp unit further comprises upper and lower daylight running lights, upper and lower primary lights, and turn signal lights.

18. The method of claim 11, wherein providing a sequence control unit that permits a user to design a sequence of all three control units: said light color control unit, light pattern control unit, and light rate control unit; wherein said sequence control unit connects to said mobile user interface.

19. The method of claim 11, wherein providing a music synchronizing module that interfaces with said sequence control unit; wherein said music synchronizing module is downloadable;

wherein said music synchronizing module in turn comprises a microphone module and a music input module that use artificial intelligence to synchronize a sequence of musical beats with a sequence of light rates, colors, and patterns.

20. The method of claim 19, wherein said music input module is a data stream from a digital storage, comprising at least one of a digital cloud, a memory card, or any digital storage device.

* * * * *